United States Patent Office.

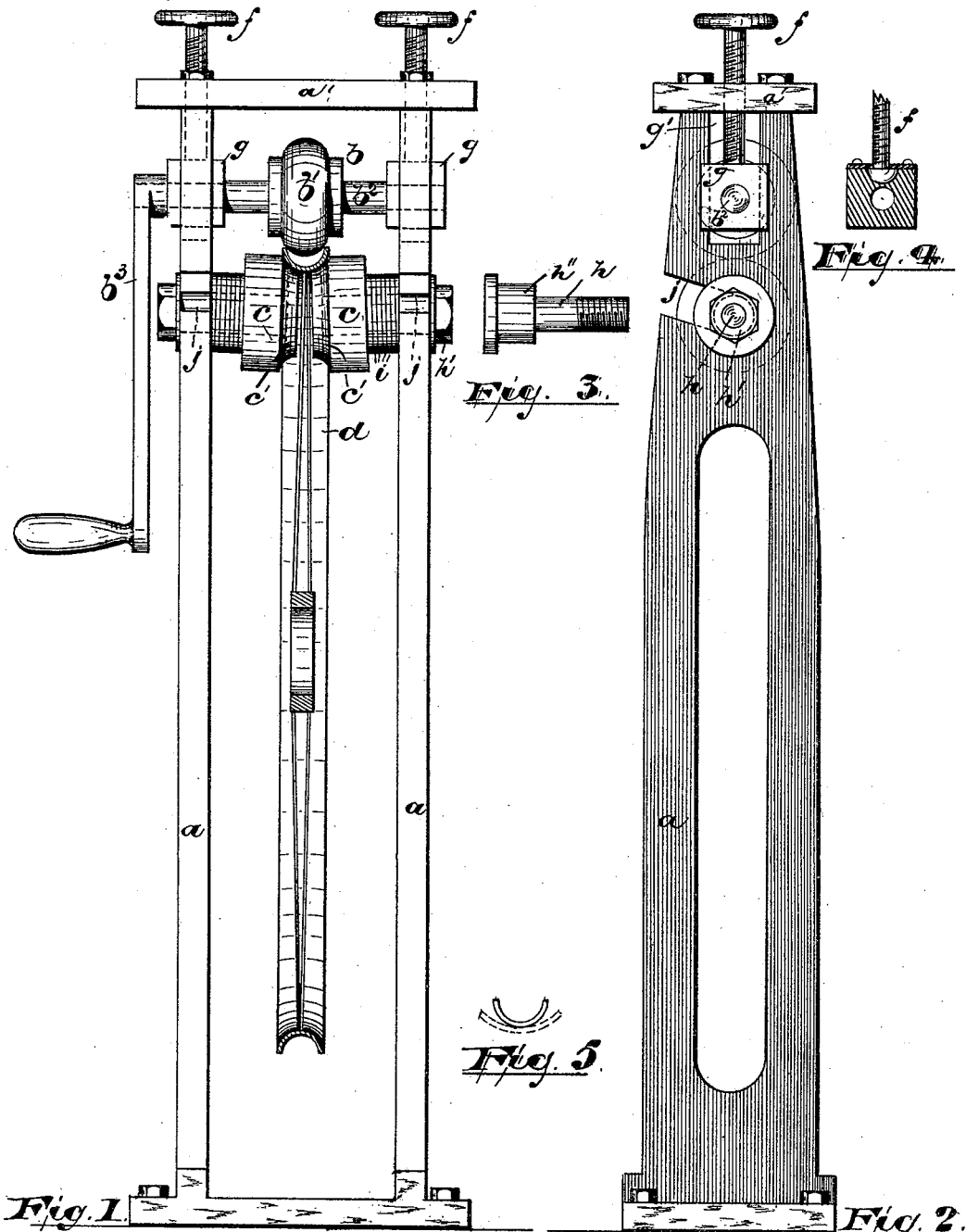

JOHANNES A. DU BOIS, OF NEWARK, NEW JERSEY.

RIM-SPREADER FOR VELOCIPEDE-WHEELS.

SPECIFICATION forming part of Letters Patent No. 499,824, dated June 20, 1893.

Application filed April 9, 1892. Serial No. 428,435. (No model.)

*To all whom it may concern:*

Be it known that I, JOHANNES A. DU BOIS, a citizen of the United States, residing at Newark, in the county of Essex and State of New Jersey, have invented certain new and useful Improvements in Rim-Spreaders for Velocipede-Wheels; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to enable the wheels of bicycles or velocipedes having rims adapted to receive rubber tires of small diameter to be spread so as to be adapted to receive tires of larger diameters, such as are now commonly known as cushion or pneumatic tires; to enable the change referred to to be made with facility and ease and without disconnecting the rim from the spokes of the wheel or otherwise changing the relation or disturbing the assembled parts, and to secure other advantages and results some of which will be referred to in connection with the description of the working parts.

The invention consists in the improved rim spreader for bicycle or velocipede wheels and in the arrangements and combinations of parts, all substantially as will be hereinafter set forth and finally embodied in the clauses of the claim.

Referring to the accompanying drawings in which like letters indicate corresponding parts in each of the several figures Figure 1 is a front view of the machine and Fig. 2 a side elevation of the same. Figs. 3, 4 and 5 are detail views all of which will be hereinafter more fully referred to.

In said drawings, $a$, $a'$, indicate a suitable frame securely fastened to the floor or other fixture. This provides bearings for the working parts.

$b$ indicates a male spreading roll, having on its periphery a convexity $b'$ corresponding with the concavity desired in the periphery of the wheel. The said roll, $b$, is arranged on a suitable shaft, $b^2$, at one end of which is a crank, $b^3$, by means of which the said shaft and roll are turned by manual labor. The said shaft has its bearings in vertically sliding journal boxes $g$, $g$, arranged in slots, $g'$, in the frame $a$, and said boxes are controlled by hand-screws $f$, $f$, by means of which the said boxes are raised from engagement with the rim, $d$, of the wheel or lowered into such engagement with sufficient force to spread the upwardly projecting flanges of said rim so that the peripheral concavity or groove will fit the larger tire. The hand screws are suitably secured to the boxes to enable them to either raise or lower said boxes, the manner of connecting said parts being illustrated in Fig. 4.

The female rollers $c$, $c$, arranged beneath the male rollers serve to engage the under or convex face of the rim and are concaved at their corners, as at $c'$, to provide suitable co-operating spreading bearings. Said rolls are arranged on pivotal bolts, $h$, Fig. 3, secured by nuts, $h'$, to the standards, $a$, of the frame on opposite sides of the wheel-way or space in which the wheel turns in connection with the spreading operation. The said bolts are separate and independent of one another, a space being formed between to allow a passage to the spokes. The wheels or rolls, $c$, are comparatively small and do not extend downward to the hub of the vehicle wheel and thus occupy space in the wheel-way and interfere with the working and manipulation of the wheel. Said wheels bear first on the convex side of the rim at or near the center, while the spreading roll or wheel engages the concave side and bears outwardly at the edges, bending the rim to the desired reduced convexity. The bearing wheels are held at opposite inclines, as shown in Fig. 1, to allow for the spreading spokes of the wheel as will be understood.

The separate rolls $c$, $c$, are adjustable to increase or diminish the space between, the desired adjustment being secured by washers $i$, one of which may be wedge shaped to secure the desired inclination in each roll. To enable the wheel to be inserted between said rolls $c$, $c$, one or both of the latter are separable from the frame $a$, the said frame being slotted, as at $j$, to admit the removal of the said roll or rolls to enable the washers, $i$, to be arranged on the pivotal bolts to secure the desired distance of separation and the disposition of the vehicle wheel between said rolls. The bolts, $h$, are provided with shoulders, $h''$, between which and the standards, $a$, the washers, $i$, are arranged to prevent jamming or binding of the rolls, $c, c$, carried by the enlarged portion of said bolts.

The vertically adjustable roller, $b$, may be removed with its journal and boxes from the frame, to allow of a larger roll being substituted, the slots, $g'$, in the standards, in which the boxes work, being extended to the top of said standards and being closed by the removable connecting portion, $a'$, of the frame. The removal of said connecting portion, $a'$, admits of a removal of said male spreading roll and its bearings as will be apparent.

In operating the invention, the vehicle wheel being in the relation shown in Fig. 1, the crank is turned by hand or other power, the screws, $f$, are turned from time to time to force the spreading roll between the flanges of the wheel so that said flanges are forced to assume the shape shown in Fig. 5 in outline without interfering with the spokes of the wheel.

Having thus described the invention, what I claim as new is—

1. In a rim spreader, the combination with the wheel, $b$, having the convex periphery adapted to enter between the flanges of the rim, and separate rollers $c, c$, arranged on independent journal bearings and adapted to bear on the under side of the rim and allow a passage of the spokes between, substantially as set forth.

2. In a rim spreading machine for velocipede wheels, the combination with the spreading wheel or roll $b$, of inclined bearing wheels $c, c$, arranged on separate journal bearings or pivots adapted to allow the spokes of the wheel to pass between, substantially as set forth.

3. In a rim spreading machine for velocipede wheels, the combination with the spreading roll, $b$, and hand screws for lowering the same, of separate inclined bearing wheels arranged on bolts, $h$, secured by nuts, $h'$, to the standard $a$ of the frame on opposite sides of the wheel-way in the frame, the said bolts being independent one of the other and separate to allow the wheel to work between, substantially as set forth.

4. In a rim spreading machine, the combination with the vertically slotted frame $a$ having boxes $g, g$, and adjusting screws $f$, a shaft $b^2$ working in said boxes, a roll $b$, bolts $h, h$, carrying wheels $c, c$, one or both of which is removable from the frame substantially as and for the purposes set forth.

5. In combination, the frame $a, a'$, having the slots $g'$ and opening $j$, boxes $g$, adjusting screws $f$, inclined bearing rolls $c, c$, arranged on bolts $h$, and washers $i, i$, all arranged and adapted to operate substantially as set forth.

In testimony that I claim the foregoing I have hereunto set my hand this 1st day of April, 1892.

JOHANNES A. DU BOIS.

Witnesses:
CHARLES H. PELL,
OSCAR A. MICHEL.